US011670155B1

(12) United States Patent
Acosta et al.

(10) Patent No.: US 11,670,155 B1
(45) Date of Patent: *Jun. 6, 2023

(54) SYSTEMS AND METHODS FOR DETECTING WATER EVENTS IN VEHICLES

(71) Applicant: United Services Automobile Association (USAA), San Antonio, TX (US)

(72) Inventors: Stefanie Jean Acosta, San Antonio, TX (US); Carlos JP Chavez, San Antonio, TX (US); Janelle Denice Dziuk, Falls City, TX (US); Michael Joseph Gaeta, San Anotnio, TX (US); Stacy Callaway Huggar, San Antonio, TX (US); Emily Kathleen Krebs, San Antonio, TX (US); Jeffrey Neal Pollack, San Antonio, TX (US); Mitzi Ruiz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,761

(22) Filed: May 4, 2022

Related U.S. Application Data

(63) Continuation of application No. 16/749,649, filed on Jan. 22, 2020, now Pat. No. 11,348,440.

(60) Provisional application No. 62/796,413, filed on Jan. 24, 2019.

(51) Int. Cl.
*G08B 21/20* (2006.01)
*B60R 21/00* (2006.01)
*G01F 23/18* (2006.01)

(52) U.S. Cl.
CPC .............. *G08B 21/20* (2013.01); *B60R 21/00* (2013.01); *G01F 23/185* (2013.01); *B60R 2021/0016* (2013.01)

(58) Field of Classification Search
CPC .................... G08B 21/20; B60R 21/00; B60R 2021/0016; G01F 23/185
See application file for complete search history.

(56) References Cited

U.S. PATENT DOCUMENTS

| 10,119,884 | B1* | 11/2018 | Billman | .............. H01M 50/247 |
| 10,414,235 | B1* | 9/2019 | Yassan | ..................... G01S 7/539 |
| 2016/0292995 | A1* | 10/2016 | Warren | ............... H04L 12/2803 |
| 2020/0130622 | A1* | 4/2020 | Lerner | .............. B60W 50/0098 |

\* cited by examiner

*Primary Examiner* — James J Yang
(74) *Attorney, Agent, or Firm* — Fletcher Yoder P.C.

(57) ABSTRACT

Systems and methods of the present disclosure include a vehicle water detection system that includes a housing configured to be disposed within a vehicle. The vehicle water detection system also includes a water-activated battery disposed within the housing and configured to produce an electrical voltage upon contact with water. The vehicle water detection system further includes an electronic circuitry disposed within the housing and configured to detect a water event occurring in the vehicle based at least in part on the electrical voltage.

20 Claims, 3 Drawing Sheets

SYSTEMS AND METHODS FOR DETECTING WATER EVENTS IN VEHICLES

CROSS-REFERENCES TO RELATED APPLICATIONS

The present disclosure is a continuation of U.S. patent application Ser. No. 16/749,649, titled "Systems and Methods for Detecting Water Events in Vehicles," which was filed on Jan. 22, 2020, and which claims priority to U.S. Provisional Patent Application Ser. No. 62/796,413, titled "Systems and Methods for Detecting Water Events in Vehicles," which was filed on Jan. 24, 2019, both of which are herein incorporated by reference in their entireties for all purposes.

BACKGROUND

The present disclosure relates generally to detecting water events in vehicles. More specifically, the present disclosure relates to detecting water events in vehicles using water-activated batteries.

Water damage can often lead to common claims on vehicle insurance policies. Early detection of leaks, flooding, and so forth, within the vehicle can substantially lessen the severity of water damage to the vehicle. Furthermore, rapid detection of flooding within the vehicle can allow first responders to respond to vehicles in peril, such as becoming submerged in bodies of water. However, when a substantial amount of water accumulates within a vehicle, batteries of the vehicle may stop functioning, preventing detection of certain parameters of the vehicle.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

BRIEF DESCRIPTION

Figure 1:
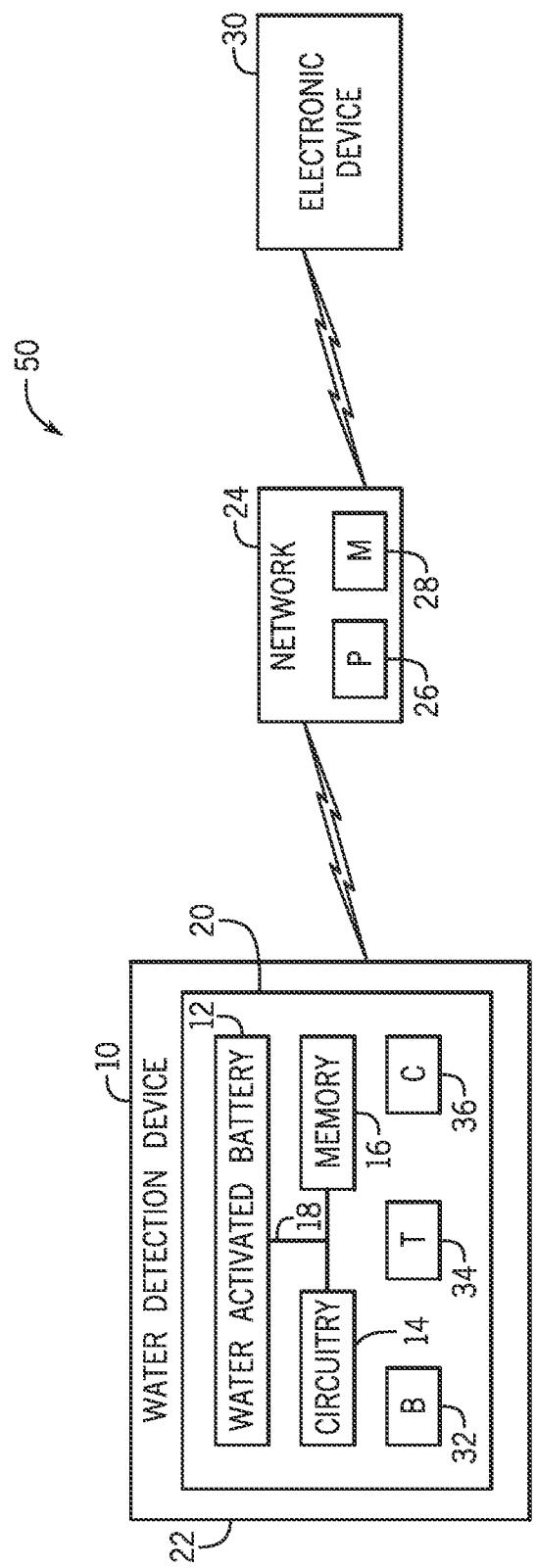
FIG. 1 is a schematic of a water detection system that includes a water detection device, in accordance with embodiments described herein.

In an embodiment, a vehicle water detection system includes a housing configured to be disposed within a vehicle. The vehicle water detection system also includes a water-activated battery disposed within the housing and configured to produce an electrical voltage upon contact with water. The vehicle water detection system further includes electronic circuitry disposed within the housing and configured to detect a water event occurring in the vehicle based at least in part on the electrical voltage.

In another embodiment, a method includes receiving, via electronic circuitry, an electrical voltage produced by a water-activated battery located within a vehicle. The method also includes detecting, via the electronic circuitry, a water event occurring in the vehicle based on the received electrical voltage.

In yet another embodiment, a vehicle water detection system includes a housing configured to be disposed within a vehicle. The vehicle water detection system also includes one or more sensors disposed within the housing and configured to detect one or more parameters relating to the vehicle. The vehicle water detection system further includes electronic circuitry disposed within the housing and configured to detect a water event occurring in the vehicle based at least in part on the detected one or more parameters.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward a water detection device (e.g., a water detection assembly) that may be utilized to monitor the presence of accumulated water (e.g., leaks, floods, and so forth) in certain locations within a vehicle, such as under seats of the vehicle, inside lower engine compartments of the vehicle, inside of spare tire compartments of the vehicle, and so forth. In certain embodiments, the water detection device may include a water-activated battery that generates an electrical voltage upon exposure to water. The water detection device may thus be in a dormant condition (e.g., no signals are sent or received) until water is present in a sufficient amount to activate the battery. The housing of the water detection device may include physical features (e.g., fluid passageways) that may direct water toward the water-activated battery, such as capillaries and/or channels that enable water to flow along a target path into the housing and toward the battery. Furthermore, in certain embodiments, the housing may include a water-soluble coating that may dissolve upon exposure to a predetermined amount of water. Therefore, components in the water detection device housing may be shielded from humidity and/or other contaminants until a sufficient amount of water is present to dissolve the coating and activate the battery.

The water detection device may be configured to communicate with one or more external electronic devices (e.g., a server, the Internet, a computer, a mobile phone, a tablet, and so forth) when the battery is activated. For example, upon exposure to water, the battery may be activated and thus supply electronic voltage to a communication beacon, which may then communicate with one or more external electronic devices to, for example, notify a user of a water detection event (e.g., a leak, a flood, or another event). In certain embodiments, the communication beacon may be in communication with one or more electronic devices via software on the electronic devices that may be utilized with the water detection device. For instance, the software may be an application on an electronic device (e.g., mobile phone, tablet, computer, or another suitable electronic device) that may be linked (e.g., paired and/or coupled) to the water detection device. The software may enable the user to monitor and manage multiple water detection devices that may be positioned in various locations within one or more vehicles. In any case, the software may alert the user of a detection event when a respective water detection device is activated upon exposure to water.

Using water-activated batteries located in areas of a vehicle that are collecting water, such as under seats, inside lower engine compartments, inside spare tire compartments, and so forth, may provide power for communicating with the one or more external electronic devices when the vehicle has lost power due to the collected water. For example, the water-activated batteries may enable the water detection device to detect and communicate information relating to the water event, such as a time when the water event started, a time period during which the water event occurred, a depth of water in the vehicle, and so forth. In addition, in certain embodiments, the water-activated batteries may power other sensors located within the vehicle, such as sodium sensors that detect salt water content, sensors that detect water quality content, mold sensors, humidity sensors, light detection and ranging (LIDAR) sensors to detect that the vehicle or portions of the vehicle are underwater, and so forth. In addition, in certain embodiments, tamper technologies may be used to minimize or prevent tampering with the water detection device. In addition, in certain embodiments, the water detection device may continuously run so as to provide data before the water event, such as vehicle speed, global positioning system (GPS) location, detection of passengers, and so forth. In addition, in certain embodiments, the water detection device may also transmit data to first responders when the water event happens to help locate the vehicle. In addition, in certain embodiments, certain material that changes color based on exposure and/or time of exposure to water could also be located on or near the water-activated battery to provide secondary indicia of the water event. In addition, in certain embodiments, safety actuation may also be provided by the water detection device to, for example, release seat belts, unlock doors, roll down windows, and so forth. In addition, certain embodiments may not include a water-activated battery. Rather, other combinations of sensed data may be employed. For example, in certain embodiments, a water detector and a GPS sensor may coordinate to, for example, indicate a level of water in the vehicle, and confirm the location is in an area of flooding. Furthermore, in certain embodiments, a flooded vehicle being pushed by water current may be detected.

As such, the embodiments described herein include a water detection device that provides safety features for a vehicle that otherwise would not be possible due, for example, loss of power that may occur due to the water event. In addition, the embodiments of the water detection device described herein facilitate more rapid detection of a water event, thereby minimizing water damage to the vehicle caused by the water event.

Turning now to the drawings, FIG. 1 is a schematic of a water detection system 50 that includes a water detection device 10 (e.g., a water detection assembly) that includes a water-activated battery 12, an electronic circuitry 14 (e.g., a processor and/or other circuitry), and memory 16, in accordance with embodiments described herein. The water-activated battery 12, the electronic circuitry 14, and/or the memory 16 may be electronically connected together using solder, a wire, a bus 18, or another suitable technique. Additionally, the water-activated battery 12, electronic circuitry 14, and/or the memory 16 may be physically coupled to one another by a connector 20 (e.g., a circuit board). In certain embodiments, the water-activated battery 12, the electronic circuitry 14, and/or the memory 16 may be disposed in a common housing 22. Furthermore, the water-activated battery 12, the electronic circuitry 14, and/or the memory 16 may be modular in design, such that the water-activated battery 12, the electronic circuitry 14, and/or the memory 16 may be connected, disconnected, and reconnected to one another as desired (e.g., via the housing 22). The water detection device 10 may also be within communication range of a communication network 24 (e.g., established by one or more devices such as a server, the Internet, and so forth). One or more devices establishing the communication network 24 may include a processor 26 and memory 28 that may be configured to store instructions that the processor 26 executes. In certain embodiments, the water detection device 10 may be configured to communicate with one or more electronic devices 30 (e.g., a computer, a tablet, a mobile phone, or another suitable electronic device) via the communication network 24, and thus, send and receive information to and from such electronic devices 30. Certain features of the water detection device 10 are described in further detail in U.S. Pat. No. 10,121,353, which issued on Nov. 6, 2018 to Billman et al., the entire contents of which are incorporated by reference herein in its entirety.

In certain embodiments, before exposure to water, the water-activated battery 12 may be in a dormant condition, such that no signal is transferred to or received from the communication network 24 by the water detection device 10. However, when the water detection device 10 is exposed to water, the water detection device 10 may be activated to an active condition, such that the water detection device 10 transmits a signal to the communication network 24 (e.g., via the electronic circuitry 14), and ultimately to an electronic device 30. In certain embodiments, the water detection device 10 may communicate directly with the electronic device 30 (e.g., via a Bluetooth feature of the water detection device 10).

The water-activated battery 12 may be capable of remaining dormant for a significant period of time before generating electrical voltage that ultimately supplies power to the electronic circuitry 14 and/or the memory 16. As discussed above, the water-activated battery 12 may remain dormant (e.g., incapable of generating a voltage) until exposed to water, when the water-activated battery 12 may then generate the electrical voltage to power the electronic circuitry 14 and/or the memory 16. For example, in certain embodiments, the water-activated battery 12 may include a dry material that initiates a chemical reaction when exposed to water. The chemical reaction may then generate the electrical voltage, which may be supplied to the electronic circuitry 14 and/or the memory 16 via the bus 18. Suitable dry materials for an anode of the water-activated battery 12 include, but are not limited to, magnesium (e.g., magnesium AZ61A, magnesium AZ31B, magnesium AP65 and magnesium MTA75), aluminum, zinc, lead, thallium, manganese, silicon, iron, calcium, nickel, copper, and/or a combination thereof.

Furthermore, the water-activated battery 12 may include a cathode and an anode, which may facilitate the chemical reaction. In certain embodiments, the cathode may include a depolarizer (e.g., sulfur, additive, binder, wax, a combination thereof, or other suitable materials) and a current collector (e.g., silver chloride, cuprous iodide, cuprous thiocyanate, lead chloride, cuprous chloride, or combinations thereof). The water-activated battery 12 may also include separators (e.g., nonconductive spacers) placed between the anode and the cathode to form a space for free ingress of electrolytes and egress of corrosion products. Separators can come in the form of disks, rods, glass beads, and woven fabrics. Dunk-type batteries may utilize a nonwoven, absorbent, nonconductive material to both separate the electrodes and absorb the electrolyte. Furthermore, in certain embodiments, the water-activated battery 12 may include a wicking material between one or more of the anode, the cathode, and/or the separators. The wicking material may enhance the ability of the water-activated battery 12 to activate upon exposure of water by directing the water to areas of the water-activated battery 12 that trigger the chemical reaction, such that the electrical voltage may be generated and supplied to the electronic circuitry 14 and/or the memory 16.

In certain embodiments, the water-activated battery 12 may include one or more cells that each include the cathode, the anode, and/or the separators. For example, in certain embodiments, the water-activated battery 12 may include four cells that are spaced apart from one another at a predetermined distance. In other embodiments, the water-activated battery 12 may include less than four cells (e.g., three, two, or one cell) or more than four cells (e.g., five, six, seven, eight, nine, ten, or more cells). Furthermore, in some cases, an efficiency of the water-activated battery 12 may be based on the spacing between the cells. For example, cells of the water-activated battery 12 may release heat and/or chemicals that may affect the operation of other cells in the water-activated battery 12. Accordingly, spacing the cells at a distance that reduces an amount of heat transferred between cells, but also reduces a size of the water-activated battery 12 may be predetermined to maximize an efficiency of the water-activated battery 12. In certain embodiments, the cells of the water-activated battery 12 may include various materials, which may also effect an efficiency of the water-activated battery 12. For example, the cells of the water-activated battery 12 may include magnesium oxide, carbon acetate, copper, and/or another suitable material that may be configured to generate an electrical voltage upon exposure to water. In some cases, water may trigger a chemical reaction in the cells of the water-activated battery 12, which may cause a circuit in the water-activated battery 12 to close, thereby enabling electrical voltage to flow to an outlet (e.g., a portion electrically coupled to the electronic circuitry 14 and/or the memory 16) of the water-activated battery 12. In certain embodiments, the battery may be activated when exposed to between 0.1 milliliters (mL) and 5 mL of water, between 0.5 mL and 3 mL of water, between 1 mL and 2 mL of water, or approximately (e.g., within 5% of or within 10% of) 1.5 mL of water.

In certain embodiments, the water detection device 10 may include an auxiliary battery 32 that may be separate from the water-activated battery 12. The auxiliary battery 32 may not be water-activated, and may be continuously in an active condition (e.g., configured to provide an electrical voltage). The auxiliary battery 32 may then be used to power the electronic circuitry 14 and/or the memory 16 by supplying the electrical voltage to the electronic circuitry 14 and/or the memory 16. In certain embodiments, the auxiliary battery 32 may enable the electronic circuitry 14 to provide intermittent signals to the electronic device 30. For example, the auxiliary battery 32 may periodically provide an electrical voltage to the electronic circuitry 14, such that the electronic circuitry 14 may perform a self-diagnosis and communicate with the electronic device 30 and/or the communication network 24. When the water-activated battery 12 activates (e.g., water contacts the water-activated battery 12), the electronic circuitry 14 may then provide a continuous signal and/or communication with the electronic device 30 and/or the communication network 24. For example, the intermittent signals may become so frequent that the signal and/or communication seems continuous or the continuous signal may override/overlay the intermittent signals. In still further embodiments, the auxiliary battery 32 may be configured to receive electrical charge wirelessly through a radio frequency (RF) device (e.g., an interrogator device that emits an electrical field toward an indicator to detect a characteristic of a component). For example, the electronic circuitry 14 may be associated with an RF tag that may provide the RF device with information associated with the electronic circuitry 14 (e.g., a status of the electronic circuitry 14, a condition of the electronic circuitry 14, and/or a function in which the electronic circuitry 14 performs). Thus, when the RF device emits the electrical field, the auxiliary battery 32 may absorb electrical energy and charge itself.

Furthermore, in certain embodiments, the water detection device 10 may include a temperature sensor 34 and/or a chemical sensor 36. In certain embodiments, the temperature sensor 34 may also be utilized to determine a presence of water. For example, the temperature in the environment surrounding the water detection device 10 may rapidly decrease upon exposure to a significant amount of water. Thus, the temperature sensor 34 may provide a confirmation that the water detection device 10 is operating properly. Additionally, in certain embodiments, the chemical sensor 36 may be utilized to monitor characteristics of the water when the water detection device 10 is exposed to water. In some cases, it may be desirable to determine whether any contaminants are present in the water upon detection of the water. For example, the water detection device 10 may be located in the interior of a structure that stores chemicals. Upon a flood event, it may be desirable to determine what chemicals may be present within the water to determine what procedures, if any, should be followed to subsequently eliminate such chemicals.

While the water-activated battery 12, the temperature sensor 34, and/or the chemical sensor 36 may be exposed to water upon a water detection event, the electronic circuitry 14 and/or the memory 16 may be included in a separate housing (e.g., within the housing 22) that seals such components from the water and/or other substances. As such, when the water enters the housing 22 of the water detection device 10, the water-activated battery 12 may generate the electrical voltage that supplies power to the electronic circuitry 14 and/or the memory 16, but the water may be blocked from contacting the electronic circuitry 14 and/or the memory 16. Therefore, the electronic circuitry 14 and/or the memory 16 may be utilized for multiple water detection events without degrading and/or otherwise incurring damage. However, in certain embodiments, the water-activated battery 12 may be replaced upon each water detection event. As discussed above, the water-activated battery 12 may be modular with respect to a housing of the water detection device 10 to facilitate replacement of the water-activated battery 12 with a new water-activated battery 12 that may be dormant until exposed to water.

While a single water detection device 10 is shown in FIG. 1, it should be noted that more than one of the water detection devices 10 may be used together within a vehicle (e.g., one, two, three, four, five, six, seven, eight, nine, ten, or more of the water detection devices 10 may be connected to the same communication network 24 and/or electronic device 30). In such embodiments, a location of each of the water detection devices 10 within the vehicle may be recorded to correspond to a device number of a corresponding water detection device 10. Such information may be recorded in a table for presentation via a graphical user interface (GUI) of a software program and/or another suitable location (e.g., memory associated with the communication network 24). To further assist a user to determine a location of one of the water detection devices 10, the location of the water detection devices 10 may be displayed in a GUI with reference to a floor plan, map, or schematic representation of the vehicle in which the water detection devices 10 are deployed.

As discussed above, the electronic device 30 may communicate with the water detection device 10. In certain embodiments, the electronic device 30 may include software that may be utilized directly with the water detection device 10. For example, the electronic device 30 may include an application or computer program that may be configured to recognize and/or interact with the water detection device 10.

In certain embodiments, the electronic circuitry 14 of the water detection device 10 may be capable of transmitting a wireless electronic signal for communication with the communication network 24 using one or more of a variety of wireless communication techniques. For example, the electronic circuitry 14 may be configured to wirelessly communicate with the communication network 24 using Wi-Fi, near field communication, Bluetooth, Zigbee, Z-wave, ISM, an embedded wireless module, or another suitable wireless communication network. Furthermore, the electronic circuitry 14 may be programmed to send a message to an address via the communication network 24, such as an IP address, URL, email address, telephone number, a dedicated monitoring station, or other type of electronic address known to those of skill in the art, and any combination of the same.

Figure 2:
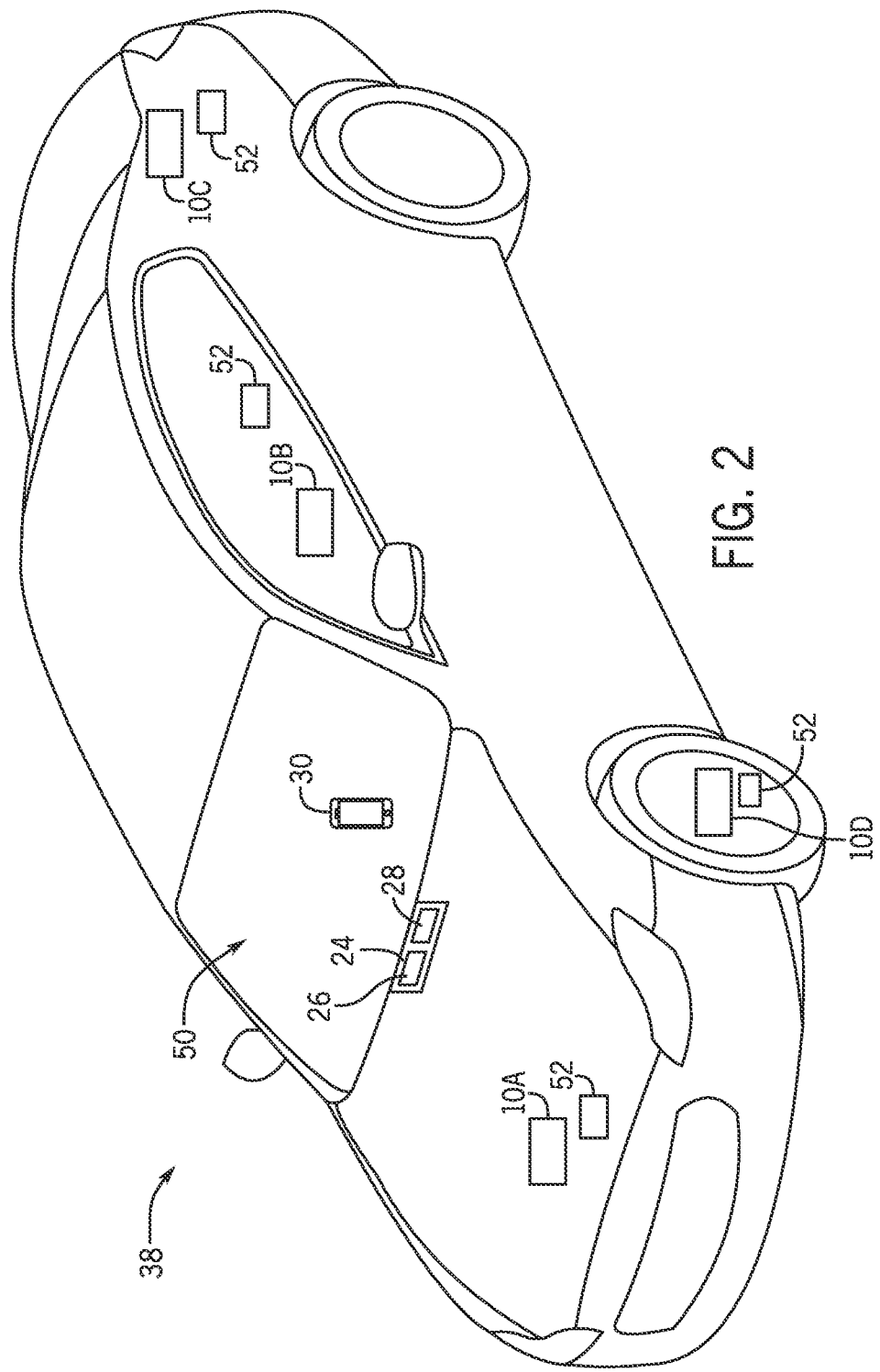
FIG. 2 is a perspective view of a vehicle that may include one or more water detection devices, in accordance with embodiments described herein.

FIG. 2 is a perspective view of a vehicle 38 that may include one or more water detection devices 10, in accordance with embodiments described herein. As illustrated in FIG. 2, the water detection devices 10 may be disposed in various locations within the vehicle 38. For example, in certain embodiments, one or more water detection devices 10A may be located in a lower engine compartment 40 under the hood 42 of the vehicle 38. In addition, in certain embodiments, one or more water detection devices 10B may be located in the interior 44 of the vehicle 38, for example, under seats within the interior 44 of the vehicle 38. In addition, in certain embodiments, one or more water detection devices 10C may be located in the trunk 46 of the vehicle 38, for example, inside a spare tire compartment located in the trunk 46 of the vehicle 38. In addition, in certain embodiments, one or more water detection devices 10D may be located adjacent tires 48 of the vehicle 38. In other embodiments, one or more water detection devices 10 may be disposed in various other locations within or adjacent components of the vehicle 38.

In embodiments where the water detection devices 10 include water-activated batteries 12, the water detection devices 10 may provide power for communicating with one or more external electronic devices 30 when the vehicle 38 has lost power due to collected water, such as flooding. For example, the water-activated batteries 12 may enable the water detection devices 10 to detect and communicate information relating to a water event, such as a time when the water event started, a time period during which the water event occurred, a depth of water in the vehicle 38, and so forth.

For example, in certain embodiments, the electronic circuitry 14 of the water detection devices 10 may be configured to determine a position of the respective water detection device 10 based on a relative position of the respective water detection device 10 with respect to one or more sensors 52 positioned within the vehicle 38, which already store data relating to positions of the respective sensors 52 within the vehicle 38. As such, the electronic circuitry 14 of the water detection devices 10 may determine their respective positions within the vehicle 38 using the known position(s) of the one or more sensors 52, and offsetting the known position(s) of the one or more sensors 52 by the relative position(s) from the one or more sensors 52. Based on this determination, the electronic circuitry 14 of the water detection devices 10 may be capable of determining a depth of water in the vehicle 38.

As also illustrated in FIG. 2, in certain embodiments, additional components of the water detection system 50 illustrated in FIG. 1 may be disposed within the vehicle 38 itself. For example, in certain embodiments, the water detection system 50 includes the one or more water detection devices 10 as well as other sensors 52, such as sodium sensors that detect salt water content, sensors that detect water quality content, mold sensors, humidity sensors, light detection and ranging (LIDAR) sensors to detect that the vehicle or portions of the vehicle are underwater, and so forth, located in the same types of locations within the vehicle 38. In certain embodiments, the water-activated batteries 12 of the water detection devices 10 may provide power to the other sensors 52 when the vehicle 38 loses power, for example, due to flooding within the vehicle 38. In certain embodiments, the other sensors 52 may include sensors (e.g., the temperature sensor 34, and/or the chemical sensor 36) that are disposed within the housing 22 of a water detection device 10.

As also illustrated in FIG. 2, in certain embodiments, the components of the communication network 24 (e.g., the processor 26 and/or the memory 28) may also be located at least partially within the vehicle 38. As described herein, the communication network 24 facilitates communication of information (e.g., alerts, and so forth) relating to water events occurring within the vehicle 38, as detected by the water detection devices 10 and/or the other sensors 52, with one or more electronic devices 30. More specifically, in certain embodiments, the water detection devices 10 and the other sensors 52 may include communication circuitry (i.e., wireless communication circuitry) configured to enable the water detection devices 10 and the other sensors 52 to communicate with the one or more electronic devices 30 via the communication network 24. In addition, in certain embodiments, the water detection devices 10 and/or the other sensors 52 may also transmit data to first responders via the communication network 24 when the water event happens to help locate the vehicle 38. For example, in certain embodiments, the water detection devices 10 and/or the other sensors 52 may be configured to directly transmit data to an emergency telephone number such as 9-1-1, to local police, to local firefighters, to local emergency medical technicians, to one or more local hospitals or other health care facilities, or some combination thereof. In addition, in certain embodiments, the water detection devices 10 may be configured to continuously run so as to provide data before the water event, such as vehicle speed, global positioning system (GPS) location, detection of passengers, and so forth, via the communication network 24. In addition, in certain embodiments, safety actuation may also be provided by the water detection devices 10 to, for example, release seat belts, unlock doors, roll down windows, and so forth. For example, the water detection devices 10 may be communicatively coupled to the components of the vehicle 38 (e.g., seat belts, doors, windows, and so forth) via the communication network 24 such that the components of the vehicle 38 may be actuated.

In addition, in certain embodiments, tamper technologies may be used to minimize or prevent tampering with the water detection devices 10. In addition, in certain embodiments, certain material that changes color based on exposure and/or time of exposure to water could also be located on or near the water-activated batteries 12 of the water detection devices 10 to provide secondary indicia of the water event. In addition, certain embodiments may not include the water detection devices 10 including water-activated batteries 12. Rather, other combinations of sensed data may be employed. For example, in certain embodiments, the other sensors 52 may include a water detector and/or a GPS sensor that may coordinate to, for example, indicate a level of water in the vehicle 38, and confirm the location is in an area of flooding. Furthermore, in certain embodiments, a flooded vehicle 38 being pushed by water current may be detected.

Figure 3:
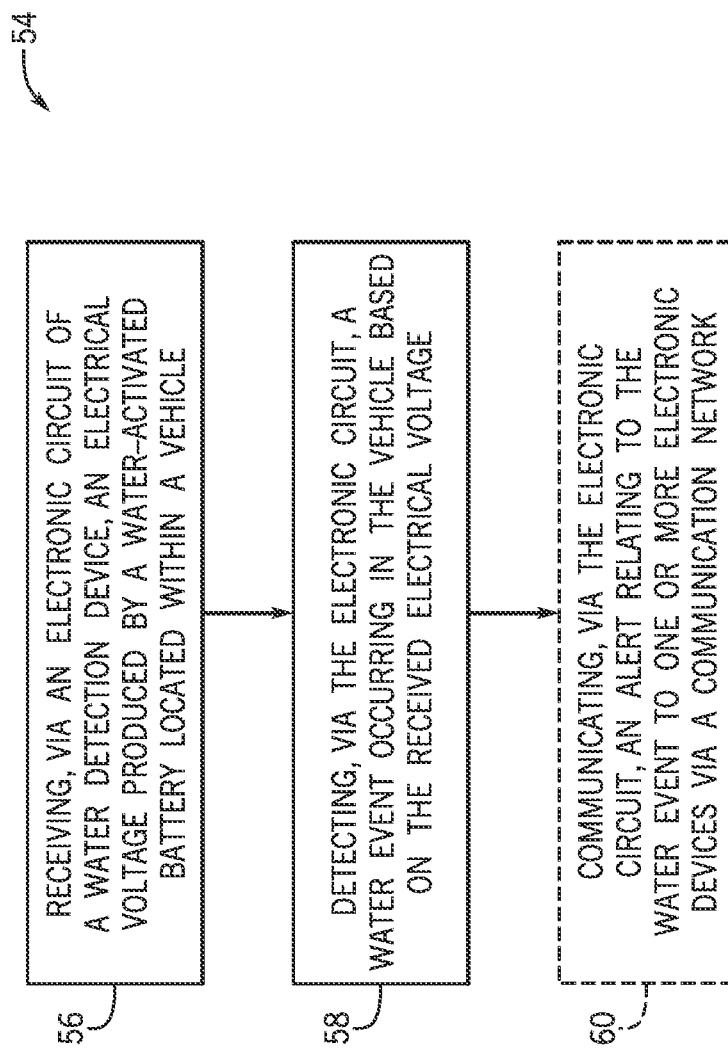
FIG. 3 is a block diagram of a method for utilizing the water detection system, in accordance with embodiments described herein.

FIG. 3 is a block diagram of a method 54 for utilizing the water detection system 50, in accordance with embodiments described herein. In certain embodiments, the method 54 includes receiving, via an electronic circuitry 14 of a water detection device 10, an electrical voltage produced by a water-activated battery 12 located within a vehicle 38 (block 56). In addition, in certain embodiments, the method 54 includes detecting, via the electronic circuitry 14, a water event occurring in the vehicle 38 based on the received electrical voltage (block 58). In addition, in certain embodiments, the method 54 optionally includes communicating, via the electronic circuitry 14, an alert relating to the water event to one or more electronic devices 30 via a communication network 24 (block 60). For example, in certain embodiments, the electronic circuitry 14 may be configured to communicate with one or more first responders via the communication network 24. For example, in certain embodiments, the electronic circuitry 14 may be configured to directly communicate information to an emergency telephone number such as 9-1-1, to local police, to local firefighters, to local emergency medical technicians, to one or more local hospitals or other health care facilities, or some combination thereof.

In addition, in certain embodiments, the method 54 includes other optional steps including, for example, communicating, via the electronic circuitry 14, instructions (e.g., control signals) to components of the vehicle 38 to actuate the components of the vehicle 38, for example, to release one or more seat belts of the vehicle 38, to unlock one or more doors of the vehicle 38, to roll down one or more windows of the vehicle 38, or some combination thereof, upon detection of the water event. In addition, in certain embodiments, the method 54 may optionally include determining, via the electronic circuitry 14, a time when the water event started, a time period during which the water event occurred, a depth of water in the vehicle 38, or some combination thereof. In addition, in certain embodiments, the method 54 may optionally include detecting, via one or more other sensors 52, one or more parameters relating to the water event, such as a salt water content, a water quality content, a mold content, humidity, one or more images of the vehicle 38 (e.g., if the sensor 52 includes a camera), one or more parameters of the vehicle 38 before the water event occurred (e.g., a speed of the vehicle 38, an acceleration of the vehicle 38, a global positioning system (GPS) location of the vehicle 38, a detection of brakes of the vehicle 38 being engaged, a detection of interaction with a steering wheel of the vehicle 38, a detection of passengers within the vehicle 38, and so forth), or some combination thereof, and communicating this information to the electronic circuitry 14 of the water detection devices 10 for the purpose of enabling the electronic circuitry 14 to communicate this information to one or more electronic devices 30 via the communication network 24, as described in detail herein. In addition, in certain embodiments, the method 54 may optionally include powering the one or more other sensors 52 using the received electrical voltage. In addition, in certain embodiments, the method 54 may optionally include powering the electronic circuitry 14 at least in part by the electrical voltage. In addition, in certain embodiments, the method 54 may optionally include powering the electronic circuitry 14 with an auxiliary battery 32 when the water-activated battery 12 is not producing the electrical voltage.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A vehicle water detection system, comprising:
one or more sensors configured to detect one or more parameters relating to operation of a vehicle;
a water-activated battery configured to produce an electrical voltage upon contact with water; and
circuitry configured to detect a water event occurring in the vehicle based at least in part on the electrical voltage, to at least partially power the circuitry and the one or more sensors using the electrical voltage after the water event has occurred within the vehicle, to receive data relating to the one or more parameters relating to operation of the vehicle from the one or more sensors both before and during the water event within the vehicle, and to communicate the one or more parameters relating to operation of the vehicle to one or more devices external to the vehicle in response to detection of the water event.

2. The vehicle water detection system of claim 1, wherein the one or more parameters relating to the operation of the vehicle comprise a speed of the vehicle, an acceleration of the vehicle, a detection of brakes of the vehicle being engaged, a detection of interaction with a steering wheel of the vehicle, or some combination thereof.

3. The vehicle water detection system of claim 1, wherein the circuitry is configured to:
determine a global positioning system (GPS) location of the vehicle, and
communicate the GPS location of the vehicle to the one or more devices in response to detection of the water event.

4. The vehicle water detection system of claim 1, wherein the circuitry is configured to:
determine additional information relating to the water event, wherein the additional information relating to the water event comprises a time when the water event started, a time period during which the water event occurred, a depth of water in the vehicle, or some combination thereof, and communicate the additional information relating to the water event to the one or more devices in response to detection of the water event.

5. The vehicle water detection system of claim 1, wherein the circuitry is configured to:

determine additional information relating to water in the vehicle, wherein the additional information relating to the water in the vehicle comprises a salt water content, a water quality content, a mold content, humidity, one or more images of the vehicle, or some combination thereof, and communicate the additional information relating to the water in the vehicle to the one or more devices in response to detection of the water event.

6. The vehicle water detection system of claim 1, wherein the circuitry is configured to communicate instructions to the vehicle to release one or more seat belts of the vehicle, to unlock one or more doors of the vehicle, to roll down one or more windows of the vehicle, or some combination thereof, in response to detection of the water event.

7. The vehicle water detection system of claim 1, wherein the circuitry is configured to communicate an alert relating to the water event to the one or more devices in response to detection of the water event.

8. The vehicle water detection system of claim 1, wherein the circuitry is configured to communicate an alert relating to the water event to one or more first responders in response to detection of the water event.

9. The vehicle water detection system of claim 1, comprising an auxiliary battery configured to at least partially power the circuitry and the one or more sensors when the water-activated battery is not producing the electrical voltage.

10. The vehicle water detection system of claim 1, comprising an anti-tampering mechanism.

11. The vehicle water detection system of claim 1, wherein the water-activated battery comprises a material configured to change color based on exposure to water.

12. A method, comprising:

detecting, via one or more sensors, one or more parameters relating to operation of a vehicle;

receiving, via circuitry, an electrical voltage produced by a water-activated battery located within the vehicle;

detecting, via the circuitry, a water event occurring in the vehicle based at least part on the electrical voltage;

at least partially powering the circuitry and the one or more sensors using the electrical voltage after the water event has occurred within the vehicle;

receiving, via the circuitry, data relating to the one or more parameters relating to operation of the vehicle from the one or more sensors both before and during the water event within the vehicle; and communicating, via the circuitry, the one or more parameters relating to operation of the vehicle to one or more devices external to the vehicle in response to detection of the water event.

13. The method of claim 12, wherein the one or more parameters relating to the operation of the vehicle comprise a speed of the vehicle, an acceleration of the vehicle, a detection of brakes of the vehicle being engaged, a detection of interaction with a steering wheel of the vehicle, or some combination thereof.

14. The method of claim 12, comprising:

determining, via the circuitry, a global positioning system (GPS) location of the vehicle, and communicating, via the circuitry, the GPS location of the vehicle to the one or more devices in response to detection of the water event.

15. The method of claim 12, comprising:

determining, via the circuitry, additional information relating to the water event, wherein the additional information relating to the water event comprises a time when the water event started, a time period during which the water event occurred, a depth of water in the vehicle, or some combination thereof, and communicating, via the circuitry, the additional information relating to the water event to the one or more devices in response to detection of the water event.

16. The method of claim 12, comprising:

determining, via the circuitry, additional information relating to water in the vehicle, wherein the additional information relating to the water in the vehicle comprises a salt water content, a water quality content, a mold content, humidity, one or more images of the vehicle, or some combination thereof, and communicating, via the circuitry, the additional information relating to the water in the vehicle to the one or more devices in response to detection of the water event.

17. The method of claim 12, comprising communicating, via the circuitry, instructions to the vehicle to release one or more seat belts of the vehicle, to unlock one or more doors of the vehicle, to roll down one or more windows of the vehicle, or some combination thereof, in response to detection of the water event.

18. The method of claim 12, comprising communicating, via the circuitry, an alert relating to the water event to the one or more devices in response to detection of the water event.

19. The method of claim 12, comprising communicating, via the circuitry, an alert relating to the water event to one or more first responders in response to detection of the water event.

20. The method of claim 12, comprising at least partially powering, via an auxiliary battery, the circuitry and the one or more sensors when the water-activated battery is not producing the electrical voltage.

* * * * *